US012790235B2

(12) United States Patent
Gupta

(10) Patent No.: US 12,790,235 B2
(45) Date of Patent: Nov. 10, 2026

(54) AUTOMATED MODULATION OF ANTIMICROBIAL CHEMISTRY APPLICATION IN WATER SYSTEMS

(71) Applicant: ECOLAB USA INC., St. Paul, MN (US)

(72) Inventor: Amit Gupta, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 921 days.

(21) Appl. No.: 17/684,989

(22) Filed: Mar. 2, 2022

(65) Prior Publication Data

US 2022/0289594 A1 Sep. 15, 2022

Related U.S. Application Data

(60) Provisional application No. 63/160,344, filed on Mar. 12, 2021.

(51) Int. Cl.
*C02F 1/00* (2023.01)
*C02F 1/70* (2023.01)
(Continued)

(52) U.S. Cl.
CPC ................ *C02F 1/008* (2013.01); *C02F 1/70* (2013.01); *C02F 1/72* (2013.01);
(Continued)

(58) Field of Classification Search
CPC .... C02F 1/008; C02F 1/70; C02F 1/72; C02F 2103/023; C02F 2209/04; C02F 2209/29;
(Continued)

(56) References Cited

U.S. PATENT DOCUMENTS 5,774,633 A 6/1998 Baba et al.
6,808,630 B2 10/2004 Yang
(Continued)

FOREIGN PATENT DOCUMENTS

WO 2016073725 A1 5/2016
WO 2020160655 A1 8/2020

OTHER PUBLICATIONS

A. Ray and S. Goswami, “IoT and Cloud Computing based Smart Water Metering System,” 2020 International Conference on Power Electronics & IoT Applications in Renewable Energy and its Control (PARC), Mathura, India, 2020, pp. 308-313, doi: 10.1109/PARC49193.2020.236616.
(Continued)

*Primary Examiner* — Pranav N Patel
(74) *Attorney, Agent, or Firm* — Eric D. Babych; Barnes & Thornburg LLP

(57) ABSTRACT

A controller receives sensor data from a sensor of a water system in response to operation of the water system in an automation phase. The sensor generates data indicative of oxidant level of the water system. The controller determines observed water chemistry behavior based on the sensor data and compares the observed water chemistry behavior to learned water chemistry behavior. The water chemistry behavior may include a rate of increase or decrease. The controller performs an automation action in response to the comparison. The automation action may include modifying addition of oxidizing chemistry to the water system, generating an alarm, or sending an alert. The controller may receive sensor data in response to operation of the water system in a learning phase and determine the learned water chemistry behavior based on the sensor data received during the learning phase.

9 Claims, 4 Drawing Sheets

(51) Int. Cl.
*C02F 1/72* (2023.01)
*C02F 103/02* (2006.01)

(52) U.S. Cl.
CPC .... *C02F 2103/023* (2013.01); *C02F 2209/04* (2013.01); *C02F 2209/29* (2013.01)

(58) Field of Classification Search
CPC .......... C02F 2209/005; C02F 2209/006; C02F 2209/008; C02F 2303/04; C02F 1/685; C02F 1/722; C02F 1/76; C02F 2209/00; C02F 2209/003; C02F 2209/001
See application file for complete search history.

(56) References Cited

U.S. PATENT DOCUMENTS

| | | | | |
|---|---|---|---|---|
| 9,475,714 | B2 | 10/2016 | Amir et al. | |
| 9,932,245 | B2 | 4/2018 | Schmitt et al. | |
| 2003/0066788 | A1 | 4/2003 | Wang et al. | |
| 2006/0169646 | A1 | 8/2006 | Andree et al. | |
| 2014/0311991 | A1* | 10/2014 | Hicks | F22D 11/006 210/742 |
| 2018/0186656 | A1* | 7/2018 | Drewniak | C02F 5/125 |
| 2019/0145722 | A1 | 5/2019 | Myers et al. | |
| 2019/0194034 | A1* | 6/2019 | Giguere | C02F 1/766 |
| 2020/0216767 | A1 | 7/2020 | Wang et al. | |
| 2020/0255301 | A1 | 8/2020 | Budampati et al. | |

OTHER PUBLICATIONS

International Search Report and Written Opinion for International Application No. PCT/US2022/018520, 10 pages, mailed May 25, 2022.

* cited by examiner

AUTOMATED MODULATION OF ANTIMICROBIAL CHEMISTRY APPLICATION IN WATER SYSTEMS

TECHNICAL FIELD

The present disclosure generally relates to microbial management in water systems. More particularly, this disclosure relates to controlling microbes in water using chemical application.

BACKGROUND

Microbial management in industrial water systems is a critical requirement to reduce operational risks. In the process of microbial management, oxidizing biocides may be a primary chemical means for microbial control. Non-oxidizing biocides are supplemental treatments and are often used for specific purposes, such as for algae control. Microbial control chemistries may be applied in several different ways, for example, by continuous dosing, slug dosing, or a combination of both. Slug dosing may occur intermittently or be initiated by a timer. The applied oxidizing chemistries are often measured either directly using specific chemical sensors, or indirectly using surrogate methods, such as oxidation reduction potential (ORP).

The microbial control efficacy of an oxidizing chemistry may be impacted by what other materials beyond microorganisms are present in the water. As the oxidizing chemistry is added to the water system, part of the oxidizing chemistry may be consumed by oxidizable materials present in the water. This consumption may be referred to as "demand." The demand is a variable factor that may differ from one water system to another and may also differ for any given system. For example, quality of make-up water, seasonality, location, process leaks, dead legs, maintenance, and other factors are all factors that attribute a dynamic nature to the water system from a microbial control standpoint. This dynamism may be transient, short term, or long term depending on the cause. Typical application strategies for oxidizing chemistry may not accommodate for this variability in demand.

BRIEF SUMMARY

According to an aspect of the disclosure, a controller for controlling a water system using an oxidizing chemistry is provided. The controller is configured to receive sensor data from a sensor of the water system in response to operation of the water system in an automation phase, wherein the sensor generates data indicative of oxidant level of the water system; determine observed water chemistry behavior based on the sensor data, wherein the observed water chemistry behavior comprises a rate of increase or a rate of decrease; compare the observed water chemistry behavior to a learned water chemistry behavior associated with the water system; and perform an automation action with the water system in response to comparison of the observed water chemistry behavior to the learned water chemistry behavior.

In some aspects, the controller is further configured to receive second sensor data from the sensor in response to operation of the water system in a learning phase; and determine the learned water chemistry behavior based on the second sensor data, wherein the learned water chemistry behavior comprises a rate of increase or a rate of decrease; wherein to receive the sensor data in response to operation of the water system in the automation phase comprises to receive the sensor data in response to a determination of the learned water chemistry behavior. In some aspects, the controller is further configured to operate the water system using the oxidizing chemistry in the learning phase; and operate the water system using the oxidizing chemistry in the automation phase in response to the determination of the learned water chemistry behavior.

In some aspects, the sensor comprises an oxidation reduction potential sensor, and wherein the sensor data comprises oxidation reduction potential data. In some aspects, the sensor comprises an online titrator. In some aspects, the sensor comprises a chemistry specific sensor. In some aspects, the sensor comprises a chlorine sensor, a bromine sensor, or an ion-specific sensor.

In some aspects, to perform the automation action comprises to modify an addition of the oxidizing chemistry based on the comparison of the observed water chemistry behavior to the learned water chemistry behavior. In some aspects, to modify the addition of oxidizing chemistry comprises to send a control signal to modify operation of a pump coupled to the water system.

In some aspects, to compare the observed water chemistry behavior to the learned water chemistry behavior comprises to determine whether the rate of increase of the observed water chemistry behavior is less than a rate of increase of the learned water chemistry; and to modify the addition of the oxidizing chemistry comprises to increase the addition in response to a determination that the rate of increase of the observed water chemistry behavior is less than the rate of increase of the learned water chemistry. In some aspects, to compare the observed water chemistry behavior to the learned water chemistry behavior comprises to determine whether the rate of increase of the observed water chemistry behavior is greater than a rate of increase of the learned water chemistry; and to modify the addition of the oxidizing chemistry comprises to decrease the addition in response to a determination that the rate of increase of the observed water chemistry behavior is greater than the rate of increase of the learned water chemistry. In some aspects, to compare the observed water chemistry behavior to the learned water chemistry behavior comprises to determine whether the rate of decrease of the observed water chemistry is greater than a rate of decrease of the learned water chemistry behavior; and to modify the addition of the oxidizing chemistry comprises to increase the addition of the oxidizing chemistry in response to a determination that the rate of decrease of the observed water chemistry is greater than the rate of decrease of the learned water chemistry behavior. In some aspects, to compare the observed water chemistry behavior to the learned water chemistry behavior comprises to determine whether the rate of decrease of the observed water chemistry is less than a rate of decrease of the learned water chemistry behavior; and to modify the addition of the oxidizing chemistry comprises to decrease the addition of the oxidizing chemistry in response to a determination that the rate of decrease of the observed water chemistry is less than the rate of decrease of the learned water chemistry behavior.

In some aspects, to perform the automation action comprises to generate a notification based on the comparison of the observed water chemistry behavior to the learned water chemistry behavior. In some aspects, to generate the notification comprises to trigger an audible or visual alarm, to send a text message, to send an email message, or to create a digital log entry.

According to another aspect, a method for controlling a water system using an oxidizing chemistry is provided. The method comprises receiving, by a controller, sensor data from a sensor of the water system in response to operation of the water system in an automation phase, wherein the sensor generates data indicative of oxidant level of the water system; determining, by the controller, observed water chemistry behavior based on the sensor data, wherein the observed water chemistry behavior comprises a rate of increase or a rate of decrease; comparing, by the controller, the observed water chemistry behavior to a learned water chemistry behavior associated with the water system; and performing, by the controller, an automation action with the water system in response to comparing the observed water chemistry behavior to the learned water chemistry behavior.

In some aspects, the method further comprises receiving, by the controller, second sensor data from the sensor in response to operation of the water system in a learning phase; and determining, by the controller, the learned water chemistry behavior based on the second sensor data, wherein the learned water chemistry behavior comprises a rate of increase or a rate of decrease; wherein receiving the sensor data in response to operation of the water system in the automation phase comprises receiving the sensor data in response to a determination of the learned water chemistry behavior. In some aspects, the method further comprises operating the water system using the oxidizing chemistry in the learning phase; and operating the water system using the oxidizing chemistry in the automation phase in response to determining the learned water chemistry behavior.

In some aspects, the sensor comprises an oxidation reduction potential sensor, and wherein the sensor data comprises oxidation reduction potential data. In some aspects, the sensor comprises an online titrator. In some aspects, the sensor comprises a chemistry specific sensor. In some aspects, the sensor comprises a chlorine sensor, a bromine sensor, or an ion-specific sensor.

In some aspects, performing the automation action comprises modifying an addition of the oxidizing chemistry based on the comparison of the observed water chemistry behavior to the learned water chemistry behavior. In some aspects, modifying the addition of oxidizing chemistry comprises sending a control signal to modify operation of a pump coupled to the water system.

In some aspects, comparing the observed water chemistry behavior to the learned water chemistry behavior comprises determining whether the rate of increase of the observed water chemistry behavior is less than a rate of increase of the learned water chemistry; and modifying the addition of the oxidizing chemistry comprises increasing the addition in response to determining that the rate of increase of the observed water chemistry behavior is less than the rate of increase of the learned water chemistry. In some aspects, comparing the observed water chemistry behavior to the learned water chemistry behavior comprises determining whether the rate of increase of the observed water chemistry behavior is greater than a rate of increase of the learned water chemistry; and modifying the addition of the oxidizing chemistry comprises decreasing the addition in response to determining that the rate of increase of the observed water chemistry behavior is greater than the rate of increase of the learned water chemistry. In some aspects, comparing the observed water chemistry behavior to the learned water chemistry behavior comprises determining whether the rate of decrease of the observed water chemistry is greater than a rate of decrease of the learned water chemistry behavior; and modifying the addition of the oxidizing chemistry comprises increasing the addition of the oxidizing chemistry in response to determining that the rate of decrease of the observed water chemistry is greater than the rate of decrease of the learned water chemistry behavior. In some aspects, comparing the observed water chemistry behavior to the learned water chemistry behavior comprises determining whether the rate of decrease of the observed water chemistry is less than a rate of decrease of the learned water chemistry behavior; and modifying the addition of the oxidizing chemistry comprises decreasing the addition of the oxidizing chemistry in response to determining that the rate of decrease of the observed water chemistry is less than the rate of decrease of the learned water chemistry behavior.

In some aspects, performing the automation action comprises generating a notification based on comparing of the observed water chemistry behavior to the learned water chemistry behavior. In some aspects, generating the notification comprises triggering an audible or visual alarm, sending a text message, sending an email message, or creating a digital log entry.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
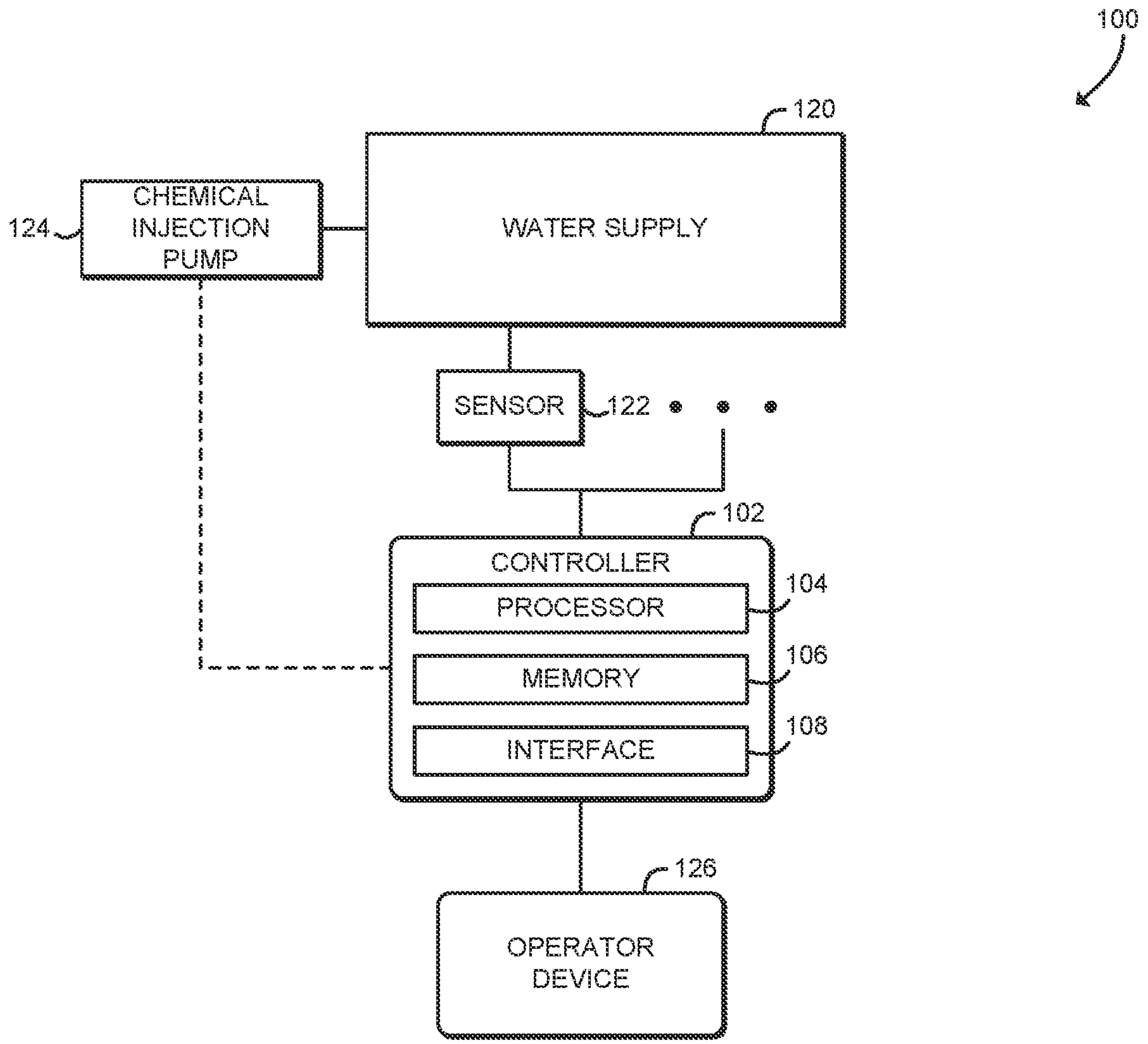
FIG. 1 shows a simplified block diagram of a system for controlling a water system using oxidizing chemistry.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Referring to FIG. 1, an illustrative water system 100 includes a controller 102 and a water supply 120. The controller 102 is coupled to one or more sensors 122 that are configured to monitor the water supply 120. One or more chemical injection pumps 124 are coupled to the water supply 120, and the controller 102 may be configured to operate the chemical injection pumps 124. The controller 102 is further coupled to an operator device 126. In use, as described further below, the controller 102 monitors sensor data received from the sensor 122 during operation of the water system 100 and determines water chemistry behavior based on the sensor data. During a learning phase, the controller 102 determines learned water chemistry behavior based on the sensor data, and during an automation phase, the controller 102 compares observed water chemistry behavior to the learned water chemistry behavior and performs one or more automation actions based on that comparison. Automation actions may include, for example, controlling application of oxidizing chemicals into the water system 100, notifying an operator, or performing other actions based on the observed water chemistry behavior. Accordingly, by performing automation actions based on learned and observed water chemistry behavior, the water system 100 may accommodate for changes in demand or other variability in the water system 100, which may improve microbial control efficacy and/or reduce costs.

The water supply 120 may be embodied as any utility water, fresh water, process water, or other water system in which water is treated with a monitorable chemical technology. For example, the water supply 120 may be included in or otherwise used with an institutional facility, a manufacturing facility, a food and beverage process water system, a health care facility, a textile care/laundry facility, a paper producing facility, a mining facility, a power plant or other energy facility, or any other facility that produces and/or uses treated water.

The illustrative controller 102 may be embodied as any programmable logic controller, microcontroller, microprocessor, or other device capable of performing the functions described herein. To do so, the controller 102 may include a number of electronic components commonly associated with units utilized in the control of electronic and electromechanical systems. For example, the controller 102 may include, amongst other components customarily included in such devices, a processor 104 and a memory device 106. The processor 104 may be any type of device capable of executing software or firmware, such as a microcontroller, microprocessor, digital signal processor, or the like. The memory 106 may be embodied as one or more volatile and/or non-volatile memory device. The memory device 106 is provided to store, amongst other things, instructions in the form of, for example, a software routine (or routines) which, when executed by the processor 104, allows the controller 102 to control the water system 100 as described herein. The controller 102 also includes an interface circuit 108, which may be embodied as any analog and/or digital electrical circuit(s), component, or collection of components capable of performing the functions described herein. The interface circuit 108 converts output signals (e.g., from the sensors 122) into signals which are suitable for presentation to an input of the processor 104. In particular, in some embodiments the interface circuit 108, by an analog-to-digital (A/D) converter, or the like, converts analog signals into digital signals for use by the processor 104. Similarly, the interface circuit 108 may convert signals from the processor 104 into output signals which are suitable for presentation to the electrically-controlled components associated with system 100 (e.g., the chemical injection pump 124). In particular, the interface circuit 108, by use of a variable-frequency signal generator, digital-to-analog (D/A) converter, or the like, may convert digital signals generated by the processor 104 into analog signals for use by the electronically-controlled components associated with the system 100, such as the pump 124. It is contemplated that, in some embodiments, the interface circuit 108 (or portions thereof) may be integrated into the processor 104.

Each of the sensors 122 may be embodied as any electronic sensor capable of measuring oxidant level in the water supply 120 or otherwise providing proportional data upon oxidant addition to the water supply 120. In some embodiments, the sensor 122 may be an oxidation reduction potential (ORP) sensor. Additionally or alternatively, in some embodiments the sensors 122 may include an online titrator or a chemistry specific sensor such as a chlorine sensor, a bromine sensor, or an ion-specific sensor. As described above, the sensor 122 may provide sensor data in the form of analog and/or digital signals that are indicative of water chemistry to the controller 102.

The chemical injection pump 124 may be embodied as a pump used to add oxidizing chemistry or other biocide to the water supply 120 for microbial control. The chemical injection pump 124 may be in fluid communication with a storage device. Each storage device may comprise one or more chemicals, and the chemical injection pumps may transport those chemicals into the water supply 120. In some embodiments, the chemical injection pump 124 comprises the storage device. In some embodiments, the pump 124 may be controlled (e.g., turned on and off, speed controlled, or otherwise controlled) automatically by the controller 102. The pump 124 may be in communication with the controller 102 in any number of ways, such as through any combination of wired connection, a wireless connection, electronically, cellularly, through infrared, satellite, or according to any other types of communication networks, topologies, protocols, standards, and more. Accordingly, in some embodiments the controller 102 may send signals to the pump 124 to control its chemical feed rate. Additionally or alternatively, in some embodiments, the pump 124 may be manually controlled.

The operator device 126 may be embodied as any computer, workstation, mobile computing device, mobile communication device, server, or other computing device that may be used by an operator to interact with the system 100. Accordingly, the operator device 126 may include a user interface (e.g., a graphical user interface that may include cathode ray tube, liquid crystal display, plasma display, touch screen, or other monitor) and/or other components typically found in a computer or other computing device.

Additionally or alternatively, in some embodiments, the controller 102 and/or the operator device 126 may be embodied as a distributed control system or other “virtual server” formed from multiple computing devices distributed across a network and operating in a public or private cloud. Accordingly, although each of the controller 102 and the operator device 126 are illustrated in FIG. 1 and described below as being embodied as a single computing device, it should be appreciated that the controller 102 and/or the operator device 126 may be embodied as multiple devices cooperating together to facilitate the functionality described below. For example, in some embodiments, the controller 102 and/or the operator device 126 may be embodied as a digital automated industrial control system that uses geographically distributed control loops throughout a factory, machine, or other control area.

Figure 2:
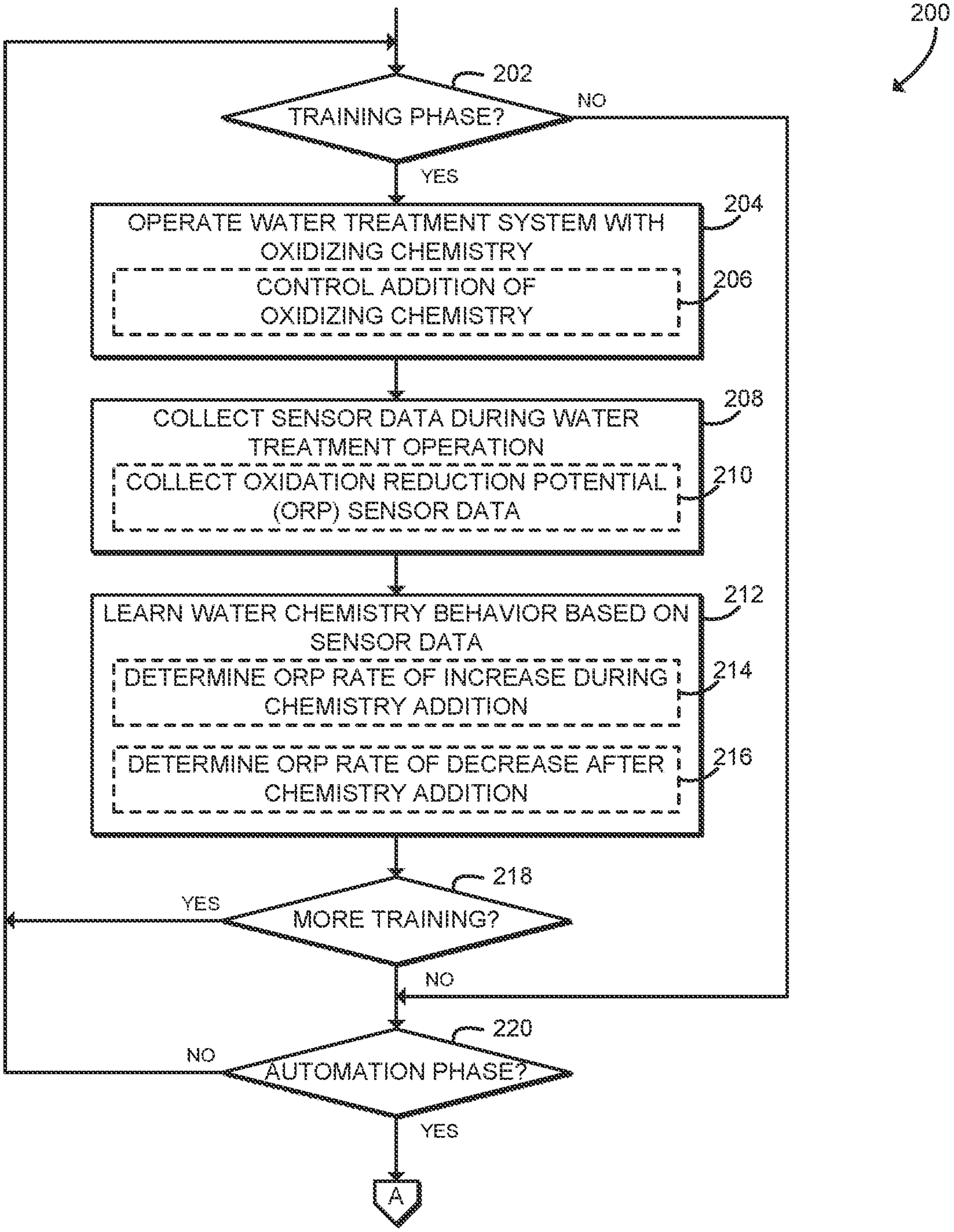
FIGS. 2 and 3 show a simplified flow diagram of at least one embodiment of a method for controlling the water system that may be executed by a controller of FIG. 1.
Figure 3:
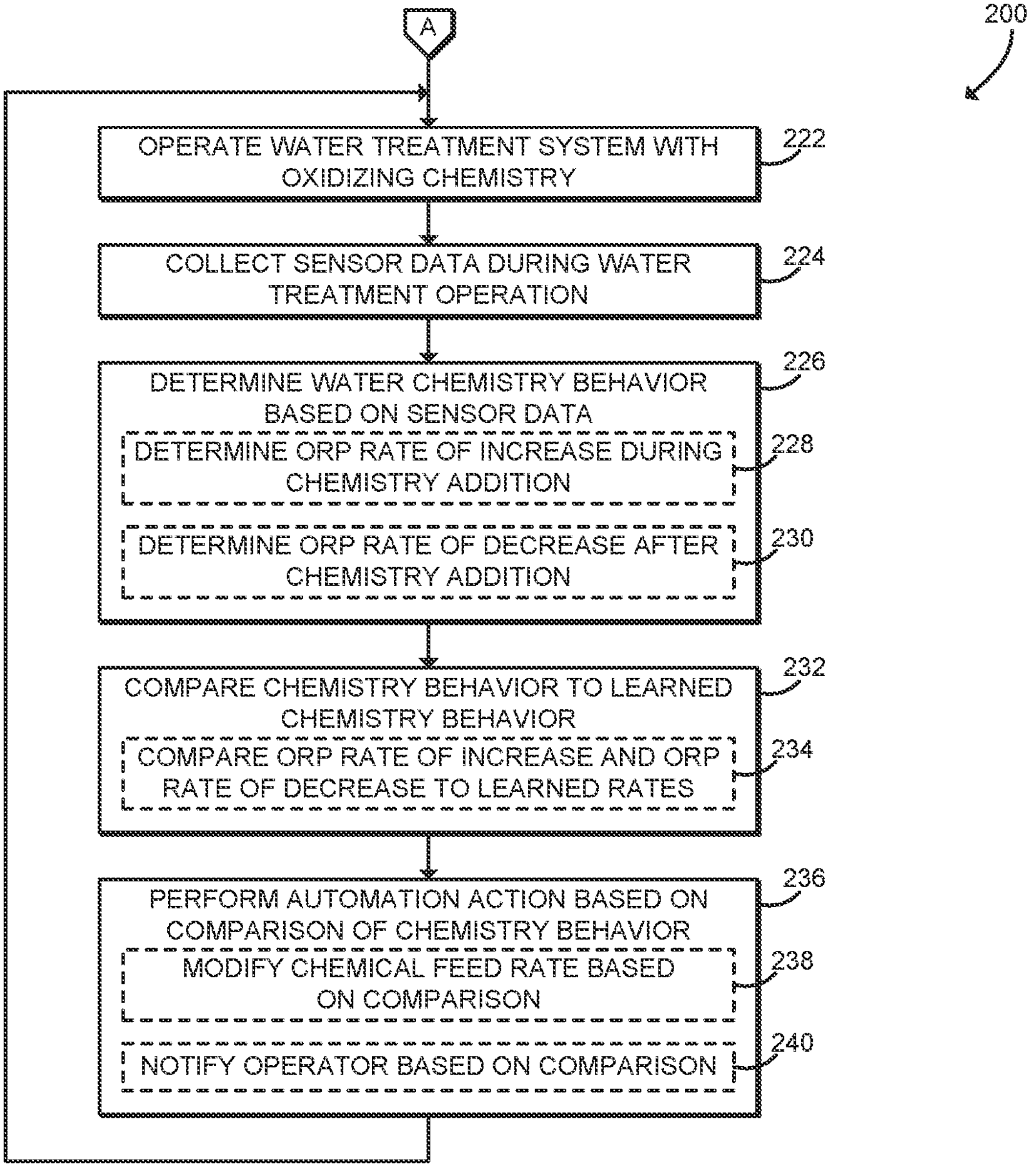

Referring now to FIGS. 2 and 3, in use, the controller 102 may execute a method 200 for controlling the water system 100. The method 200 begins in block 200, in which the controller 102 determines whether to operate in a training phase. The controller 102 may initially operate in the training phase, or in some embodiments the training phase may be selected by an operator or otherwise selected based on one or more other criteria. For example, the controller 102 may enter the training phase if learned water chemistry behavior has not yet been determined. If the controller 102 determines not to enter the training phase, the method 200 branches ahead to block 220, described below. If the controller 102 determines to enter the training phase, the method 200 advances to block 204.

In block 204, the water system 100 is operated with the addition of oxidizing chemistry. For example, one or more of the chemical injection pumps 124 may operate to add oxidizing chemistry to the water supply 120. The oxidizing chemistry may include, for example, PURATE™, Accu-Pro™, ACTI-BROM®, ControlBrom™, or STA-BR-EX™, which are commercially available from Ecolab®. As additional examples, the oxidizing chemistry may include sodium hypochlorite (i.e., bleach), peracetic acid (PAA)/$H_2O_2$, bromochlorodimethylhydantoin (BCDMH), $ClO_2$, monochloramine, stabilized chlorine, unstabilized chlorine, stabilized bromine, unstabilized bromine, 2,2-dibromo-3-nitrilopropionamide (DBNPA), or any other oxidizing chemistry or a monitorable chemistry for microbial control in the water supply 120. The pumps 124 may be operated using a default schedule, a manual schedule, or other chemical addition schedule to control the rate and/or amount of chemical addition. In some embodiments, in block 206, the controller 102 may control the addition of oxidizing chemistry. For example, the controller 102 may command the chemical injection pumps 124 to activate and/or deactivate.

In block 208, the controller 102 collects sensor data from the sensors 122 during water treatment operation. The sensor data is indicative of the level of oxidizing chemistry present in the water supply 120. For example, the sensor data may be a proportional signal indicative of the amount of oxidant present in the water supply 120. In some embodiments, in block 210 the controller 102 collects oxidation reduction potential (ORP) sensor data from one or more ORP sensors 122.

In block 212, the controller 102 learns water chemistry behavior based on the sensor data. For example, the controller 102 may determine and/or record the oxidant level in the water supply 120 over time, during and after application of oxidizing chemistry to the water supply 120. In some embodiments, in block 214 the controller 102 may determine an ORP sensor data rate of increase during chemistry addition. In some embodiments, in block 216 the controller 102 may determine an ORP sensor data rate of decrease after chemistry addition.

In block 218, the controller 102 determines whether to perform additional training. The controller 102 may use any appropriate criteria to determine whether to perform additional training. For example, the controller 102 may collect training data for a predetermined time or until the oxidant level has reduced to a predetermined level. In some embodiments, the controller 102 may perform additional training in response to an operator command. If the controller 102 determines to perform additional training, the method 200 loops back to block 202. If not, the method 200 advances to block 220.

In block 220, the controller 102 determines whether to operate in an automation phase. The controller 102 may operate in the automation phase after the training phase is complete, or in some embodiments the automation phase may be selected by an operator or otherwise selected based on one or more other criteria. For example, the controller 102 may enter the automation phase in response to determining the learned water chemistry behavior. If the controller 102 determines not to enter the automation phase, the method 200 loops back to block 202, described above. If the controller 102 determines to enter the automation phase, the method 200 advances to block 222, shown in FIG. 3.

Referring to FIG. 3, in block 222 the water system 100 is operated with the addition of oxidizing chemistry. As described above, during operation one or more of the chemical injection pumps 124 may operate to add the oxidizing chemistry to the water supply 120. The pumps 124 may be operated manually or according to a set schedule to control the rate and/or amount of chemical addition. In some embodiments, the controller 102 may control the addition of oxidizing chemistry, for example by commanding the chemical injection pumps 124 to activate and/or deactivate.

In block 224, the controller 102 collects sensor data from the sensors 122 during water treatment operation. As described above, the sensor data is indicative of the level of oxidizing chemistry present in the water supply 120. For example, the sensor data may be a proportional signal indicative of the amount of oxidant present in the water supply 120. In some embodiments, the controller collects ORP sensor data from one or more ORP sensors 122.

In block 226, the controller 102 determines observed water chemistry behavior based on the sensor data. For example, the controller 102 may determine and/or record the oxidant level in the water supply 120 over time, during and after application of oxidizing chemistry to the water supply 120. In some embodiments, in block 228 the controller 102 may determine an ORP sensor data rate of increase during chemistry addition. In some embodiments, in block 230 the controller 102 may determine an ORP sensor data rate of decrease after chemistry addition.

In block 232, the controller 102 compares the observed water chemistry behavior determined as described above in connection with block 226 to the learned water chemistry behavior determined as described above in connection with block 212. By comparing the observed water chemistry behavior to the learned water chemistry behavior, the controller 102 may determine the relative demand of the water system 102 (e.g., relative consumption of oxidizing chemistry) as compared to the demand during the learning phase. In some embodiments, in block 234 the controller 102 may compare an observed ORP rate of increase to a learned ORP rate of increase and/or compare an observed ORP rate of decrease to a learned ORP rate of decrease. For example, the controller 102 may determine whether ORP is increasing faster or slower than the learned behavior during chemical addition. As another example, the controller 102 may determine whether ORP is decreasing faster or slower than the learned behavior after chemical addition. Such changes in ORP rate of increase or decrease may indicate relative demand of the water system 100 during the automation phase as compared to the learning phase.

In block 236, the controller 102 performs one or more automation actions based on the comparison of observed behavior to learned behavior. Each automation action may include performing a command, generating a notification, sending a message, asserting a signal, or performing another action based on the comparison of observed behavior to learned behavior. In some embodiments, in block 238 the controller 102 may modify a chemical feed rate based on the comparison. For example, if the observed ORP rate of increase is slower than the learned behavior or if the observed ORP rate of decrease is faster than the learned behavior, the controller 102 may increase the chemical feed rate. As another example, if the observed ORP rate of increase is faster than the learned behavior or if the observed ORP rate of decrease is slower than the learned behavior, the controller 102 may decrease the chemical feed rate. The controller 102 may modify the chemical feed rate by, for example, sending one or more control signals to control operation of the chemical injection pump 124. Continuing that example, the controller 102 may modify on or off times for the pump 124, speed control the pump 124, or otherwise control operation of the pump 124. In some embodiments having multiple pumps 124, the controller 102 may modify the chemical feed rate by activating or deactivating one or more of the pumps 124. For example, to increase the chemical feed rate, the controller 102 may activate a secondary pump 124 in addition to any pumps 124 that are already in operation.

In some embodiments, in block 240 the controller 102 may notify an operator based on the comparison. For example, the controller 102 may generate one or more visual or auditory alarms based on the comparison. As another example, the controller 102 may send a text message, email message, or otherwise send a message to the operator device 126 to notify the operator of the comparison. In yet another example, the controller 102 may create a digital log entry or other digital imprint including information based on the comparison. In some embodiments, the alarm, the notification, and/or the log entry may include information related to the modified chemical feed rate determined as described above. For example, the alarm, the message, and/or the log entry may instruct the operator to manually adjust operation of one or more chemical injection pumps 124. After performing the automation action, the method 200 loops back to block 222 to continue operating the water treatment system 100 in the automation phase.

Figure 4:
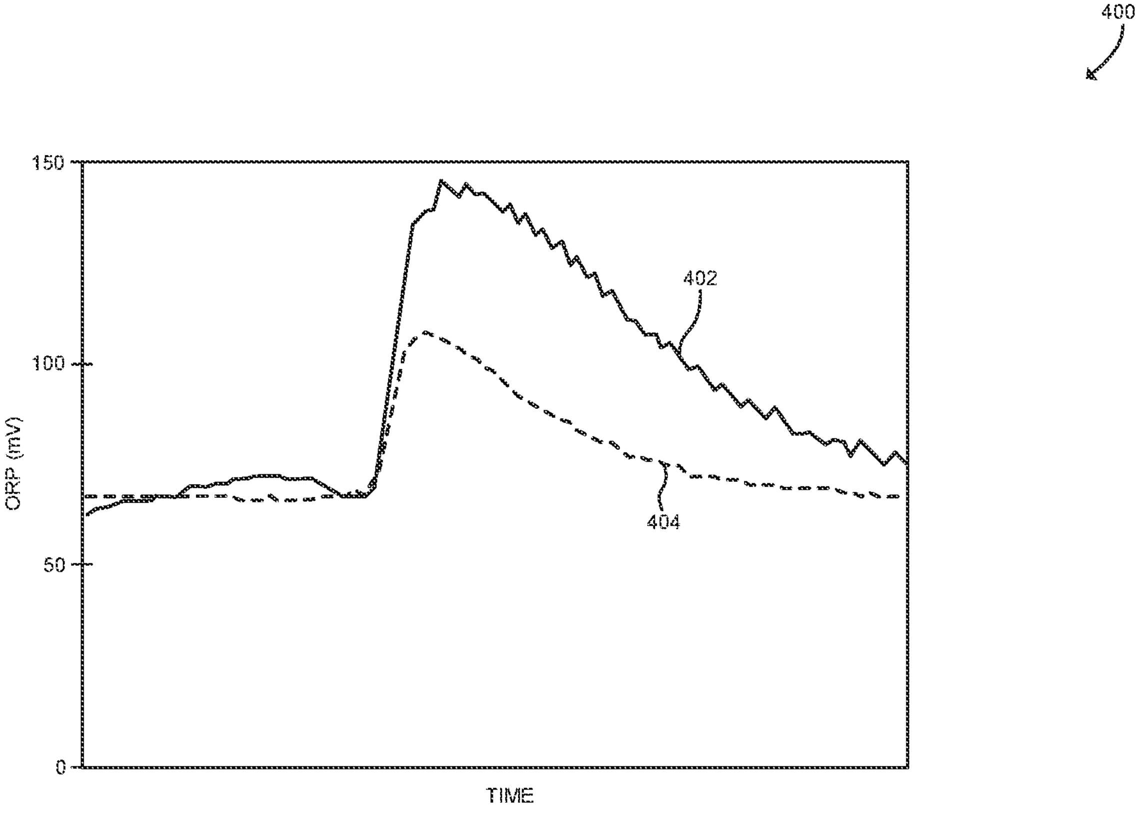
FIG. 4 is a plot showing illustrative sensor data that may be measured by the water system of FIGS. 1-3.

Referring now to FIG. 4, plot 400 illustrates sensor measurements that may be generated by the system 100. The plot 400 shows ORP (in millivolts) versus time measured by an illustrative ORP sensor 122 of the system 100. As an illustrative example, curve 402 may illustrate sensor measurements during a learning phase of operation of the system 100. As shown, the curve 402 increases in response to addition of oxidizing chemistry, for example by operation of the chemical injection pump 124. After a slug of oxidizing chemistry has been added, the chemical injection pump 124 is turned off, and the curve 402 gradually reduces toward its original level.

Continuing that example, curve 404 may illustrate sensor measurements during an automation phase of operation of the system 100. As shown, the curve 404 also increases in response to addition of oxidizing chemistry. In the illustrative example, the chemical injection pump 124 is operated during the automation phase for the same duration (on time) as during the learning phase. However, the curve 404 reaches a lower peak value than the curve 402, and the curve 404 reduces in value more quickly than the curve 402. These differences between the curves 402, 404 may be the result of differences in demand for the water system 100 over time. As described above, the controller 102 compares the learned water chemistry behavior associated with the curve 402 to the observed water chemistry behavior associated with the curve 404, and then performs one or more automation actions based on that comparison. In the illustrative embodiment, based on that comparison and in order to respond to increased demand, the controller 102 may increase the on time for the chemical injection pump 124, generate a message or other notification instructing an operator to activate the chemical injection pump 124, or otherwise increase the addition of oxidizing chemistry to the water supply 120.

As used herein, the term "controller" refers to a manual operator or an electronic device having components, such as input and output protocols, a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components.

The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, and/or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components, such as a signal conditioner or system monitor, may be included to facilitate signal transmission and signal-processing algorithms.

In certain aspects, the controller includes hierarchy logic to prioritize any measured or predicted properties associated with system parameters. It should be appreciated that the object of such hierarchy logic is to allow improved control over the system parameters and to avoid circular control loops.

As described above, the water system may comprise a plurality of sensors, which are capable of analyzing the water and transmitting data regarding the water to the controller. As further disclosed above, the presently disclosed water system comprises, in certain embodiments, one or more chemical injection pumps. In certain embodiments, the water system is implemented to have the plurality of sensors provide continuous or intermittent feedback, feed-forward, and/or predictive information to the controller, which can relay this information to a relay device, such as the Nalco Global Gateway, which can transmit the information via cellular communications to a remote device, such as a cellular telephone, computer, and/or any other operator device that can receive cellular communications. This remote device can interpret the information and automatically send a signal (e.g., electronic instructions) back, through the relay device, to the controller to cause the controller to make certain adjustments, for example to the output of the pumps. The information can also be processed internally by the controller and the controller can automatically send signals to the pumps to adjust the amount of chemical injection, for example. Based upon the information received by the controller from the plurality of sensors or from the remote device, the controller may transmit signals to the various pumps to make automatic, real-time adjustments, to the amount of chemical that the pumps are injecting into the water.

Alternatively, an operator of the remote device that receives cellular communications from the controller can manually manipulate the pumps through the remote device. The operator may communicate instructions, through the remote device, cellularly or otherwise, to the controller and the controller can make adjustments to the rate of chemical addition of the chemical injection pumps. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the water by one or more of the injection pumps, or any combination of the foregoing. The controller and/or the remote device is also capable of making any of the foregoing adjustments or modifications automatically without the operator actually sending or inputting any instructions. Based on the information received by the plurality of sensors, the controller or remote device can make appropriate adjustments to the pumps or send out an appropriate alert.

The sensors disclosed herein are operable to sense and/or predict a property associated with the water or system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value as described above, and, in some embodiments, generate an output signal, e.g., an electrical signal, and transmit the output signal to a receiver, such as a pump incorporating such receiver capabilities or a remote device, such as a computer or cellular telephone, incorporating receiver capabilities.

Data transmission of measured parameters or signals to chemical pumps, alarms, remote monitoring devices, such as computers or cellular telephones, or other system components is accomplished using any suitable device, and across any number of wired and/or wireless networks, including as examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used.

As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

In some embodiments, system parameter information is received from the system and archived. In certain embodiments, system parameter information is processed according to a timetable or schedule. In some embodiments, system parameter information is immediately processed in real-time or substantially real-time. Such real-time reception may include, for example, "streaming data" over a computer network.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A controller for controlling a water system using an oxidizing chemistry, the controller configured to:

receive first sensor data from a sensor of the water system in response to operation of the water system in a learning phase, wherein the sensor generates data indicative of oxidant level of the water system, wherein the sensor comprises an oxidation reduction potential sensor, and wherein the first sensor data comprises oxidation reduction potential data;

determine learned water chemistry behavior based on the first sensor data, wherein the learned water chemistry behavior comprises a learned rate of increase over time or a learned rate of decrease over time of the first sensor data in response to a first addition of a first amount of the oxidizing chemistry to the water system;

receive, in response to a determination of the learned water chemistry behavior, second sensor data from the sensor of the water system in response to operation of the water system in an automation phase;

determine observed water chemistry behavior based on the second sensor data, wherein the observed water chemistry behavior comprises a rate of increase over time or a rate of decrease over time of the second sensor data in response to a second addition of the first amount of the oxidizing chemistry to the water system;

compare the observed water chemistry behavior to the learned water chemistry behavior associated with the water system; and perform an automation action with the water system in response to comparison of the observed water chemistry behavior to the learned water chemistry behavior.

2. The controller of claim 1, wherein the controller is further configured to:

operate the water system using the oxidizing chemistry in the learning phase; and operate the water system using the oxidizing chemistry in the automation phase in response to the determination of the learned water chemistry behavior.

3. The controller of claim 1, wherein the sensor comprises a chemistry specific sensor.

4. The controller of claim 3, wherein the sensor comprises a chlorine sensor, a bromine sensor, or an ion-specific sensor.

5. The controller of claim 1, wherein to perform the automation action comprises to modify an addition of the oxidizing chemistry based on the comparison of the observed water chemistry behavior to the learned water chemistry behavior.

6. The controller of claim 5, wherein to modify the addition of oxidizing chemistry comprises to send a control signal to modify operation of a pump coupled to the water system.

7. The controller of claim 5, wherein:

to compare the observed water chemistry behavior to the learned water chemistry behavior comprises to determine whether the rate of increase of the observed water chemistry behavior is less than a rate of increase of the learned water chemistry; and to modify the addition of the oxidizing chemistry comprises to increase the addition in response to a determination that the rate of increase of the observed water chemistry behavior is less than the rate of increase of the learned water chemistry.

8. The controller of claim 1, wherein to perform the automation action comprises to generate a notification based on the comparison of the observed water chemistry behavior to the learned water chemistry behavior.

9. The controller of claim 8, wherein to generate the notification comprises to trigger an audible or visual alarm, to send a text message, or to send an email message.

* * * * *